Jan. 28, 1969   E. F. IRISH   3,423,834
DUPLI-FUNCTIONAL ARTICULATOR
Filed July 19, 1966
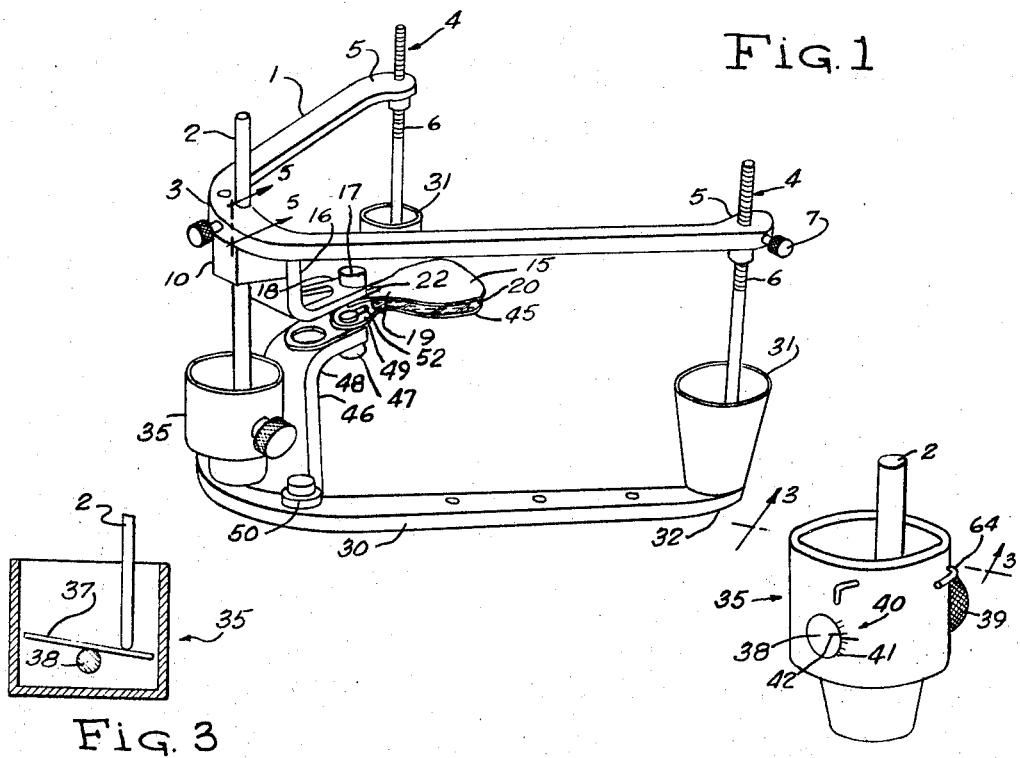
Fig. 1
Fig. 2
Fig. 3
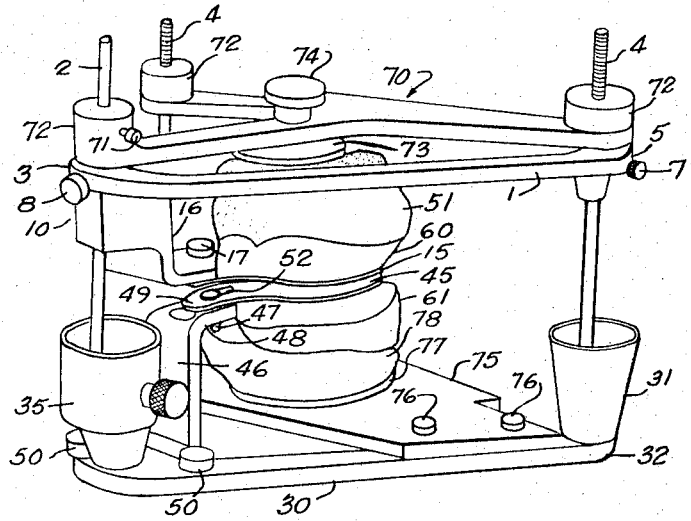
Fig. 4
INVENTOR.
EDWIN F. IRISH
BY
*Harvey S. Boyd*
ATTORNEY

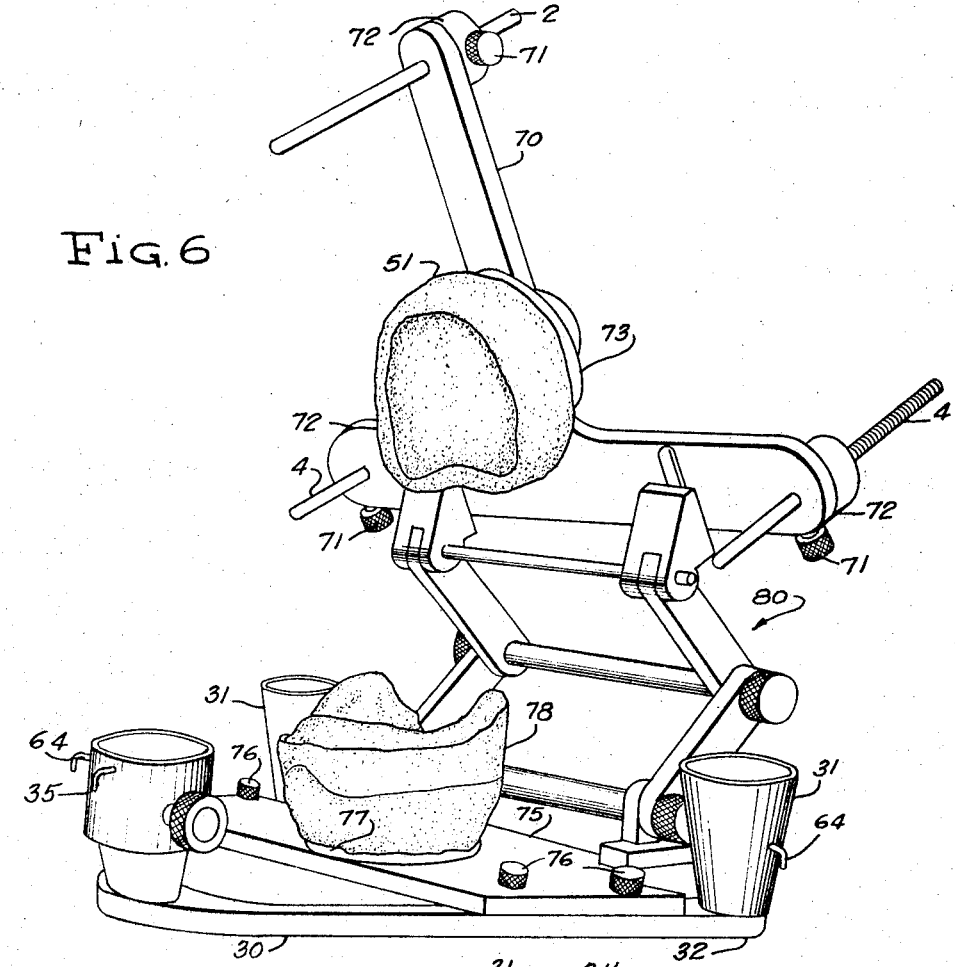
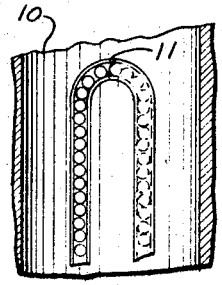
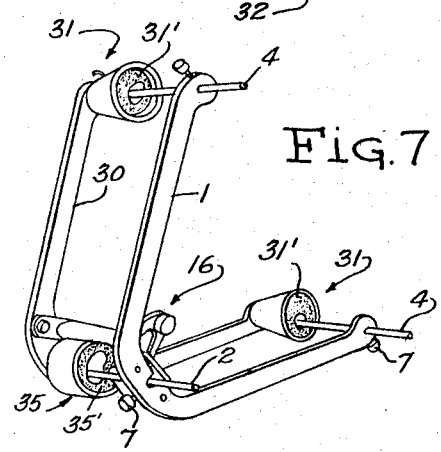

United States Patent Office 3,423,834
Patented Jan. 28, 1969

3,423,834
DUPLI-FUNCTIONAL ARTICULATOR
Edwin F. Irish, Richmond, Va., assignor to the United States of America as represented by the Administrator of Veterans Affairs and/or the Secretary of the Army
Filed July 19, 1966, Ser. No. 566,398
U.S. Cl. 32—20
Int. Cl. A61c 9/00, 11/00
4 Claims

ABSTRACT OF THE DISCLOSURE

This invention is an instrument that serves as both a maxillomandibular function recorder and a three dimensional tripod type articulator. The instrument uses an adjustable inclined plane incisal guide to accommodate posterior teeth with cusps and vertical overlap of anterior teeth, cold curing acrylic resin, and a hydraulic bearing device to make permanent, three dimensional registrations of mandibular movements. These registrations then serve, without transfer to a second device, as recordings in a tripod dental articulator.

---

The invention described herein may be manufactured and used by or for the Government for governmental purposes without the payment to me of any royalty thereon.

BACKGROUND OF THE INVENTION

Field of the invention

This invention relates to dental articulaors and more particularly to an articulator which functions first to record a patient's mandibular movements, and then, without further convertive procedures, serves as a three dimensional, tripod, dental articulator upon which dentures may be constructed and their occlusion balanced.

DESCRIPTION OF THE PRIOR ART

Dental articulators in general use possess one basic limitation in common. The necessity for transferring registrations from a recording device to a mechanical articulator limits the accuracy of manibular movements duplication outside a patient's mouth.

SUMMARY OF THE INVENTION

This invention is a combination dental articulator and mandibular movement recorder whereby permanent registrations of a patient's mandibular movements are made with a hydraulic bearing device in acrylic resin. The registrations are then used in the same tripod frame with modifications as a dental articulator.

Accordingly, it is an object to provide an accurate machine for permanently recording mandibular movements in three dimensions which is relatively simple to operate.

It is another object to provide a dental articulator which records a patient's mandibular movements, and without further convertive procedures, serves as a tripod support for constructing dentures and balancing their occlusion.

It is a further object to provide an articulator having a function recording capability characterized by the use of a central bearing device which broadens the bearing surface equalizing the pressure on a patient's denture bearing areas, and eliminating instability of the bases in all non-centered recording positions.

It is still another object to provide a three-dimensional tripod articulator capable of making permanent recordings of a patient's mandibular movements, and incorporating a variable inclined plane incisal guidance to accommodate posterior teeth with cusps and the vertical overlap of anterior teeth.

BRIEF DESCRIPTION OF THE DRAWINGS

These and other objects will become apparent with reference to the following description and drawings wherein:

FIG. 1 is a perspective view of the recording apparatus of his invention;

FIG. 2 is a perspective view of the anterior cup of the recording device;

FIG. 3 is a cross-sectional view of FIG. 2 along line 3—3;

FIG. 4 shows the recording apparatus of this invention with mounted casts;

FIG. 5 is a cross-sectional view of FIG. 1 along line 5—5;

FIG. 6 illustrates the recording apparatus functioning as an articulator with an optional mounting hinge; and FIG. 7 is a perspective view from above showing the upper and lower recording assemblies with anterior and posterior registrations in the cups.

DESCRIPTION OF THE PREFERRED EMBODIMENT

The articulator of this invention is composed of two main assemblies, an upper and a lower. The upper recording assembly, 1, is a frame extending from one condylar region, around the face, to the opposite condylar region.

A recording rod, 2, extends vertically through the anerior, 3, of the upper assembly, 1, and right and left recording rods, 4, extend vertically through the terminal areas, 5, of the upper assembly, 1. Rods, 4, may have calibration grooves, 6, for height adjustment, and set screws, 7, may coact between the upper assembly, 1, and rods, 4, to regulate the vertical displacement of the rods, 4, relative to the upper assembly, 1. A set screw, 8, in the anterior, 3, of assembly, 1, may be used to regulate the vertical displacement of rod, 2, relative to the upper assembly, 1. However, for recording purposes rod, 2, is allowed to displace freely, vertically, through the use of a linear ball bushing, 10, as shown in FIG. 5. The bushing, 10, may have three vertical races, 11, set at 120 degree intervals around the rod, 2. The bushing, 10, permits vertical motion with a minimum of friction.

A flat, upper bearing plate, 15, is attached to the upper assembly, 1, by an upper plate extension, 16. Bearing plate, 15, is attached to extension, 16, by bolt, 17, which extends through the tip, 18, of the extension, 16, and lip, 19, of plate, 15. For adjustment purposes lip, 19, has a slot, 22, for receiving bolt, 17. Slot, 22, allows adjustment of plate, 15, relative to extension, 16.

A central bearing device, 20, is bonded to the lower surface of plate, 15. The device, 20, is a fluid filled membrane. The membrane is pliable but inelastic so that the surfaces readily change contour with shifting pressures, but maintain a predetermined vertical relation. There is undiminished distribution of forces throughout a confined fluid so that the pressures are transmitted equally in all directions. This device minimizes instability of the bases in noncentered positions, a disadvantage of registrations taken with a central bearing point, by distributing the forces applied equally over the patient's denture bearing areas and ridges. The central bearing device may be a cellophane envelope filled with water and bonded to upper plate, 15, by any suitable means. The patient's saliva serves as a lubricating medium.

The lower assembly, 30, is essentially the same as upper assembly, 1. Right and left cups, 31, are mounted on the terminal areas, 32, of lower assembly, 30. Cups, 31, register on the right and left recording rods, 4, in upper assembly, 1.

Anterior cup, 35, is mounted on the anterior portion, 36, of lower assembly, 30. Cup, 35, registers on anterior recording rod, 2, in upper assembly, 1. Cup, 35, contains a variable plane incisal guide, 37. Guide, 37, is carried by shaft, 38, which extends through cup, 35. The angle of the guide, 37, relative to the plane of the lower assembly, 30, may be varied by twisting knob, 39, attached to one end of shaft, 38. The end of shaft, 38, opposite knob, 39, constitutes a degree indicator, 40, as shown in FIG. 2. The indicator, 40, may constitute grooves in the cup, 41, and a pointer, 42, on the end of the shaft, with pointer, 42, being parallel to guide, 37. A plus or minus guide variation of 25 degrees from the horizontal is sufficient for recording purposes.

A flat plate registration in the anterior cup, without an inclined guidance plane, results in a negative type of incisal guidance as explained in my article entitled, The Dupli-Functional Articulator, 15J. Pros. Dent. 642 (1965).

A flat, lower bearing plate, 45, is attached to the lower assembly, 30, by a lower plate extension, 46. Bearing plate, 45, is attached to extension, 46, by bolt, 47, which extends through the tip, 48, of the extension, 46, and lip, 49, of plate, 45. For adjustment purposes lip, 49, should have a slot, 52, for receiving bolt, 47. Slot, 52, allows adjustment of plate, 45, relative to extension, 46.

The upper extension, 16, and the lower extension, 46, may be removably attached to the upper assembly, 1, and the lower assembly, 30, respectively, by bolts, 50.

To make permanent three dimensional continuous maxillomandibular recordings an upper occlusion rim, 60, having been previously oriented by means of a wax interocclusal record mounted on a plain line articulator, in a conventional manner, is attached to the upper surface of the upper bearing plate, 15. Preliminary orientation is used to establish a vertical relation at occlusal contact and a tentative centric relation, the most retruded unstrained position of the condyles in the glenoid fossae at any given degree of jaw separation from which lateral movements can be made. See Trapozzano, An Analysis of Current Concepts of Occlusion, 5 J. Pros. Dent. 764, 765 (1955).

A lower occlusion rim, 61, is prepared and attached to the lower surface of the lower bearing plate, 45, in a manner similar to that followed with the upper occlusion rim, 60. The bearing plates, 15 and 45, are rigidly fixed to the recording assemblies, 1, and, 30, and aligned parallel to the pre-determined mean plane of occlusion.

The occlusion rims of the assembled recording apparatus are placed in the patient's mouth and seated, the lower, 61, first, and then the upper, 60. The patient is instructed to close against the central bearing device, 20, and to move the mandible in all directions to the full limit of his excursive abilities, as in the manner of making free Gothic arch (needle point) tracings. When muscular relaxation has been obtained and the patient has been oriented, the upper rods, 2 and 4, are lowered into the respective lower cups, 35 and 31. The rod ends, having been previously coated with petroleum jelly, must remain below the rims of the cups in all movements, but not contact the sides of the cups in any movement.

A cold-curing acrylic resin is poured into each cup to a height above the rod ends, and the patient is instructed to move the mandible slowly in all excursive movements, returning frequently to a centric relation. As the acrylic resin starts to set, the peripheries of the registrations are formed in the three cups.

The inclined guide, 37, carrying the resin, is arbitrarily adjusted in the anterior cup, 35, either before or during regisration compatible with the desired vertical overlap. The anterior rod, 2, designed to move up and down freely, clears out the areas of excursions against the guide, 37, within cup, 35, but does not touch the sides of the cup, 35.

Rods, 4, are locked in a vertical position with relation to the upper assembly, 1, during registration, and describe a three dimensional trough in hardened acrylic resin, 31 as shown in FIG. 7. These trough surfaces, registrations in three dimensions, incorporate the centric relation, the Bennett movement, full right, left lateral, and protrusive movements, and all variations in between these extremes.

When the resin has set the anterior rod, 2, is locked in position by screw, 8, when the patient's jaws are in centric relationship. The upper, 1, and lower, 30, assemblies are disengaged by having the patient slightly protrude the mandible before he opens.

The acrylic resin registrations, 31' and 35', produced in cups, 31 and 35, are held in place during articulation by pins, 64. Removal of pins, 64, frees registrations, 31' and 35', for removal. Registrations, 31' and 35', are then replaceable. The registrations, 31', in posterior cups, 31, provide permanent three dimensional relative equivalents of the articulation of the condyles in their fossae while the jaws remain at the predetermined vertical relation. With the anterior rod, 2, locked in the centric position it cooperates with the registration, 35', produced in the anterior cup, 35, against guide, 37, to duplicate jaw separation compatible with the vertical overlap of the anterior teeth and the posterior teeth in response to protrusive or eccentric motion.

For mounting purposes, an upper mounting plate, 70, is placed over rods, 2 and 4, resting on the upper recording assembly, 1, as shown in FIG. 4. Set screws, 71 in the rod receiving end portions, 72, are tightened to secure the plate, 70, to rods, 2 and 4. An upper cast mount, 73, is secured to plate, 70, by screw, 74. Upper cast, 51, is then constructed in a conventional manner connecting upper occlusion rim, 60, with cast mount, 73.

Lower mounting plate, 75, is attached to the lower recording assembly, 30, by screws, 76. Lower cast mount, 77, is then bolted to plate, 75. Lower cast, 78, is constructed in a conventional manner connecting lower occlusion rim, 61, with lower cast mount, 77.

When the casts, 51 and 77, are finished screws, 7 and 8, may be loosened, upper rim, 60, is then detached from upper bearing plate, 15, and upper recording assembly, 1, carrying extension, 16, bearing plate, 15, and central bearing device, 20, are separated from upper mounting plate, 70, carrying rods, 2 and 4, cast mount, 73, cast, 51, and upper rim, 60.

Lower occlusion rim, 61, is then detached from lower bearing plate, 45. Lower plate extension, 46, is separated from the lower recording assembly, 30, by removing screws, 50, and the extension, 46, and plate, 45, are removed from the lower assembly, 30. The resulting device as shown in FIG. 6 is a dental articulator having permanent function recordings.

A hinge, 80, may be used to attach the upper plate, 70, to the lower assembly, 30, to facilitate subsequent laboratory denture preparation.

Using the articulator of FIG. 6, in a conventional manner, teeth may be set up. The hinge, 80, may be removed and the rods, 4, readjusted to form a tripod support for balancing all occlusions by positioning and spot grinding, and waxed-up dentures tried in the patient's mouth. Teeth created on a geometric basis must be modified slightly to be compatible for maintaining balance through the variations recorded by the three dimensional registrations.

The dentures are processed and reseated on the articulator for selective grinding and milling. This is accomplished by moving the upper plate, 70, in all directions to the full extent allowed by the peripheries of the registrations in the three cups, 31 and 35. When the rods, 2 and 4, are contacting in the three registrations in all positions, the milling is complete and occlusal balance has been developed in the dentures.

I claim:

1. A mandibular function recorder for making permanent three dimensional continuous maxillomandibular relation registrations comprising:

(a) a base frame for encircling a patient's face carrying a lower bearing surface for insertion in a patient's mouth, said base frame having opposite terminal areas disposed so that when the bearing surface is in a patient's mouth each terminal area will be disposed adjacent one of the patient's condylar regions;

(b) registration cups for receiving a quick setting registration material, mounted on the terminal areas of said base frame;

(c) an anterior cup for receiving a quick setting registration material mounted on said base frame adjacent the anterior portion of a patient's jaw; and a variable incline incisal guide mounted within said anterior cup for supporting the registration material;

(d) an upper recording frame member for encircling a patient's face and carrying an upper bearing surface for insertion in a patient's mouth, said frame member having opposite terminal areas disposed so that when the bearing surface is in a patient's mouth each terminal area will be disposed adjacent one of the patient's condylar regions;

(e) vertically adjustable recording rods mounted in each terminal area of said upper member and disposed so that when both the upper and lower bearing surfaces are in a patient's mouth said rods register on the registration cups and extend into said cups a preselected distance for contacting the registration material;

(f) an anterior rod slidably mounted on said upper member adjacent the anterior portion of a patient's jaw so that when both the upper and lower bearing surfaces are in a patient's mouth said anterior rod registers on said anterior cup and rides on said incisal guide;

(g) an inelastic, fluid filled membrane disposed between and contacting the upper and lower bearing surfaces for maintaining a predetermined vertical relation between the bearing surfaces when the bearing surfaces are in a patient's mouth exerting an equalizing pressure against the patient's bearing areas during movement of the mandible so that accurate registrations of the maxillomandibular relation are described by the rods in the registration material in the cups as the registration material sets.

2. The device of claim 1 wherein the registration material is cold curing acrylic resin.

3. The device of claim 1 wherein the fluid filled membrane is a cellophane envelope containing water.

4. The device of claim 1 further comprising:

(a) an upper cast mount in a preselected position removably mounted on said anterior rod and said recording rods and disposed above said upper bearing surface a predetermined distance.

(b) a lower cast mount removably secured in a preselected position to said base frame and disposed below said lower bearing surface a predetermined distance; said upper cast mount adapted to support a cast connecting said upper bearing surface to said upper mount, and said lower mount adapted to support a cast connecting said lower bearing surface to said lower mount, when the bearing surfaces are not in patient's mouth.

References Cited

UNITED STATES PATENTS

| 1,228,667 | 6/1917 | Gysi | 32—32 |
| 1,670,311 | 5/1928 | Musante | 32—32 |
| 2,043,394 | 6/1936 | Reith | 32—32 |
| 3,321,832 | 5/1967 | Weisberg | 32—32 |

FOREIGN PATENTS 364,815  12/1922  Germany.

OTHER REFERENCES

E. F. Irish, "The Dupli-Functional Articulator," The Journal of Prosthetic Dentistry, vol. 15, July–August 1965 pp. 642–650.

LOUIS G. MANCENE, *Primary Examiner.*

CHARLES R. WENTZEL, *Assistant Examiner.*

U.S. Cl. X.R.

32—32